April 24, 1934.  M. P. GRANT  1,956,322
FREEZING CONTAINER FOR FROZEN FOOD PRODUCTS
Filed Nov. 4, 1932  2 Sheets-Sheet 1
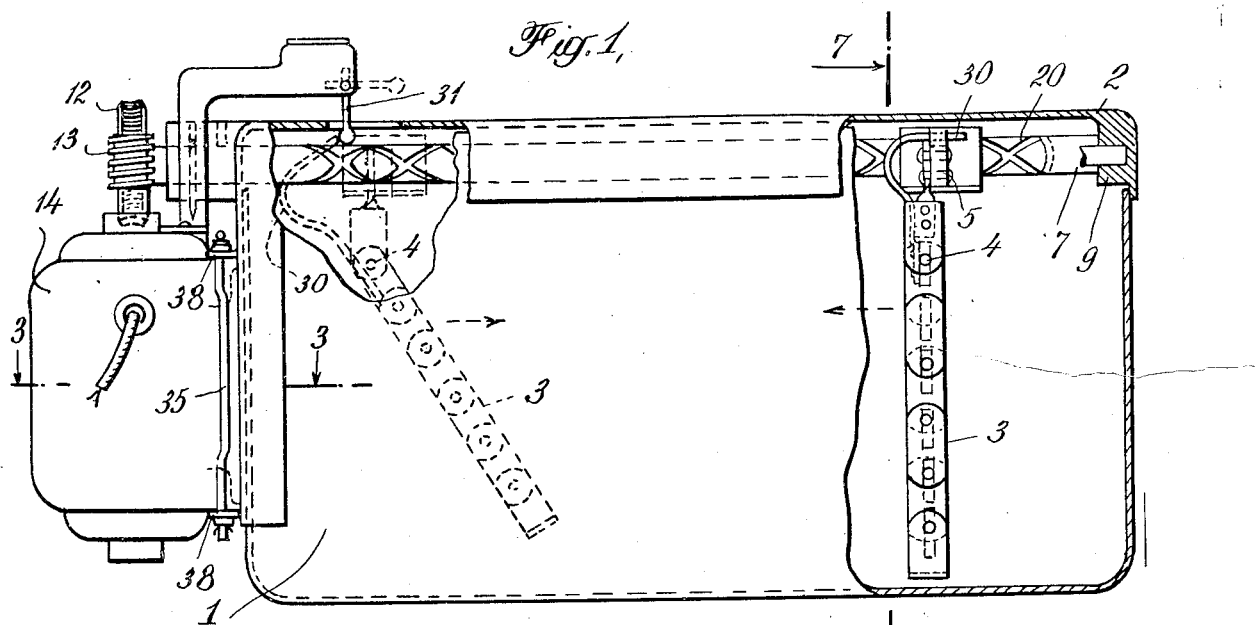
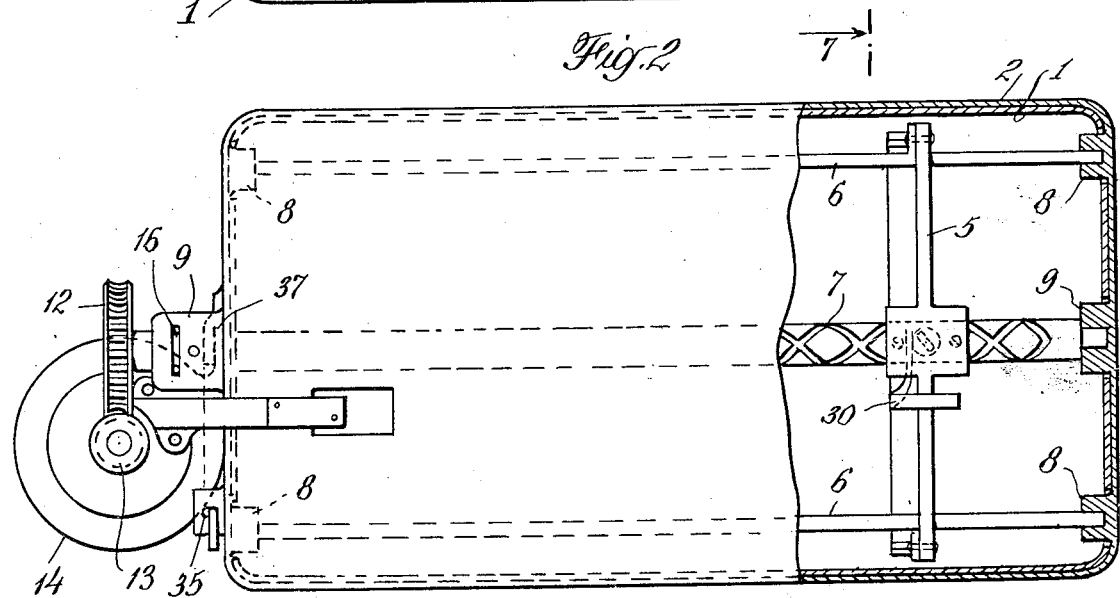
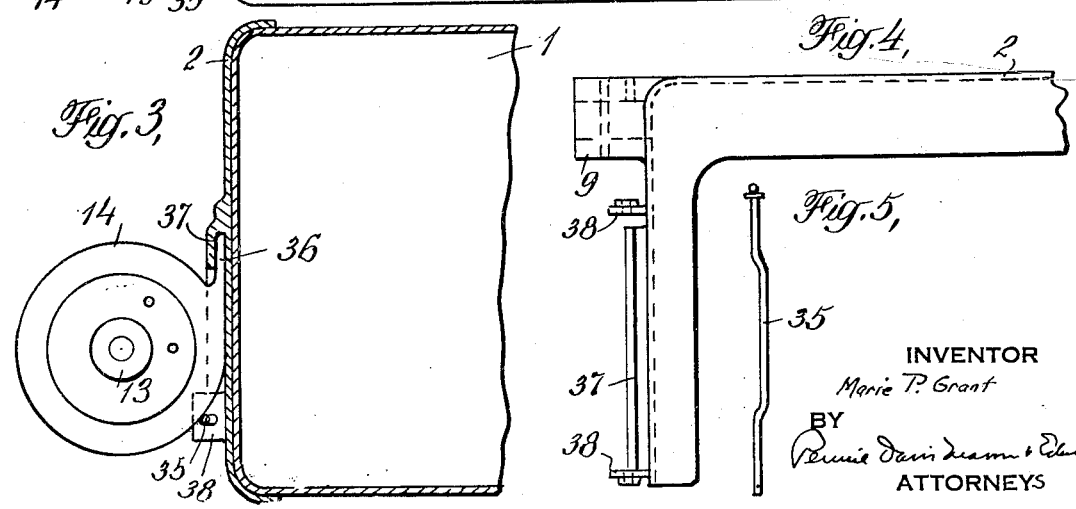
INVENTOR
Marie P. Grant
BY
ATTORNEYS April 24, 1934.    M. P. GRANT    1,956,322
FREEZING CONTAINER FOR FROZEN FOOD PRODUCTS
Filed Nov 4, 1932    2 Sheets-Sheet 2
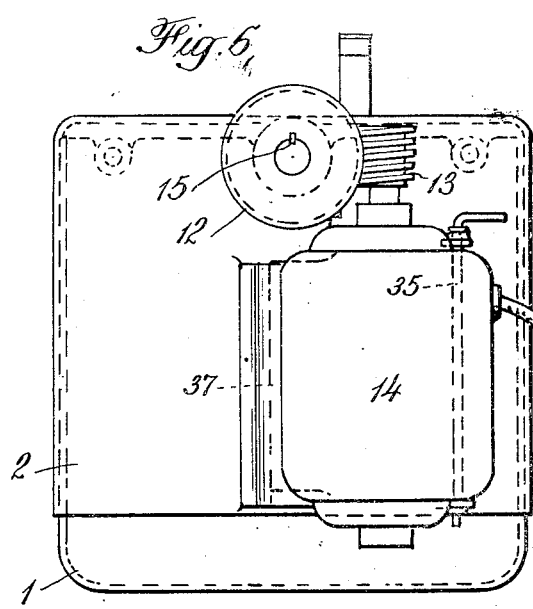
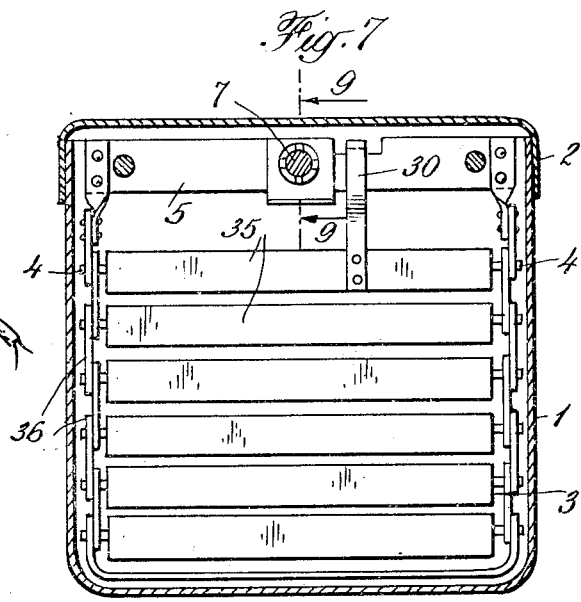
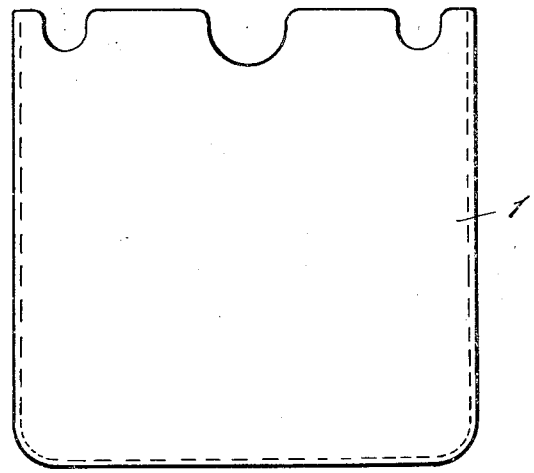
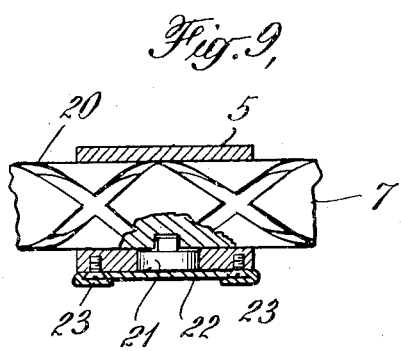
INVENTOR
Marie P Grant
BY
Pennie Davis Marvin & Edmonds
ATTORNEYS Patented Apr. 24, 1934

1,956,322

UNITED STATES PATENT OFFICE 1,956,322

FREEZING CONTAINER FOR FROZEN FOOD PRODUCTS

Marie P. Grant, New York, N. Y.

Application November 4, 1932, Serial No. 641,167

4 Claims. (Cl. 259—113)

This invention relates to a freezing container for food products which is adapted to be inserted in the freezing compartment of a domestic refrigerator of the type operated by electricity, gas or kerosene, etc. The container is equipped with an electrically operated agitator and the preferred form of the invention comprises automatic means for turning off the electric current after the food product is partially frozen and before it has frozen solid.

Pans now in general use for the preparation of frozen food products such as ice creams, ices, sherbets, etc. are not equipped with agitating means and on freezing, large crystals or flakes are formed which make the product less desirable than a smoother product free from large crystals. The device contemplated by this invention includes electrically driven means for agitating the liquid during the early portion of the freezing operation. This prevents the formation of large crystals and a smoother product is produced which in many ways is to be preferred to the product obtained without agitation.

The motor for actuating the agitator is preferably mounted on the container, and in the preferred form shown in the drawings, it is supported by a dependent portion of the cover. In this preferred form of the invention the entire agitation mechanism is supported by the cover and in such a way that it is all removed when the cover is removed from the pan. When the freezing of a dessert has progressed to the point where the agitator is no longer necessary, the whole agitator mechanism may be removed. The cover to which it is attached may be replaced by a plain cover to which no such mechanism is attached. The motor is advantageously mounted in such a way that it can be readily detached so that the container and cover with the agitator may be immersed in dish water when necessary. In the preferred form of the invention the agitator moves horizontally through the liquid and is so suspended that when the liquid has frozen to the point where it is stiff enough to prevent the agitator from hanging in a perpendicular position, a tripper on the agitator throws off the switch shutting off the motor and stopping the movement of the agitator. The agitator may then be easily removed from the pan and the cover replaced and the freezing continued without agitation. The arrangement for thus automatically shutting off the motor before the freezing is completed is an important feature of the invention because it is impossible to continue the agitation after the product has become semi-solid or solid and if the current were not shut off there would be danger of burning out some portion of the electrical equipment or the food product, as it became stiff enough, would be pushed up over the walls of the container or an otherwise unsatisfactory condition would be produced.

The invention will be further described in connection with the accompanying drawings which illustrate a preferred embodiment of my freezing container.

In the drawings Figure 1 is an elevation of the container, partly in sections;

Figure 2 is a plan view, partly in section;

Figure 3 is a sectional view on the line 3—3 of Figure 1 showing how the motor is mounted;

Figures 4 and 5 are details of the motor mounting.

Figure 6 is a front view.

Figure 7 is a section on the line 7—7 of Figure 1;

Figure 8 is a front view of the pan with the cover removed;

Figure 9 is a detail on the line 9—9 of Figure 7;

Figure 10 is a detail showing the guide pin; and

Figure 11 is a detail showing how the agitator shaft is locked in place.

The container comprises a pan 1 and cover 2. The agitator 3 is suspended by the pivots 4 from the agitator guide 5 which is slidably mounted on the guide rods 6 and is driven back and forth across the pan by the shaft 7. The agitator, guide, guide rods and driving shaft are preferably constructed as a unitary part of the cover 2 which may be easily placed in the pan when desired and removed when the freezing has progressed to the point where agitation is no longer necessary. Brackets 8 on the cover support the guide rods and bearings 9 and 10 support the shaft. The shaft extends through the front 11 of the cover and on the front end is mounted a worm wheel 12 which is actuated by the worm 13 which is mounted directly on the motor 14. The worm wheel 12 is keyed to the shaft 7 by the key 15. The shaft is held in place by the retaining lock 16.

I prefer to move the agitator horizontally through the liquid from one end of the pan to the other and for this purpose, I provide an endless right and left-hand groove 20 in the driving shaft 7. The agitator guide 5 is provided with a pin 21 which fits into this groove and by rotation of the shaft, the pin and thus the whole agitator is moved back and forth and the liquid is efficiently agitated. The pin 21 is rotatably mounted in the agitator guide and is held in place by the plate 22. This plate is advantageously screwed onto the agitator guide and the ends 23 of the plate may be bent over the screws to lock them in place, as shown clearly in Figure 9.

The agitator is pivoted from the agitator guide and is suspended substantially vertically at the beginning of the freezing operation before the liquid stiffens. As the freezing progresses, the stiffening of the food product prevents the agitator from hanging vertically and it drags through the liquid at something of an angle. When the freezing has progressed to the point where the food is so stiff that the agitator meets considerable resistance, the agitator at the end of its passage through the pan will be displaced from the vertical a sufficient amount to actuate a switch to throw off the current. This is indicated in dotted lines at the left end of Figure 1 where the agitator is shown in a tilted position about to throw the switch 31. In the drawings the tripper 30 is shown as a metallic spring which is fastened to the top agitator blade. As the agitator is moved to the front of the pan, the tripper passes under the switch 31 and then as the direction of the agitator guide is reversed, this tripper catches the switch and shuts off the current. Any other suitable means for shutting off the current may be employed.

The cover of the pan is provided with an opening 32 through which the switch is inserted. The switch may advantageously be mounted on the motor or it may be independently mounted on the inner wall of the refrigerator or in any other suitable way. I prefer to use a toggle switch which moves through a wide angle so that after the pan is assembled and the switch is turned on it will project through the opening in the cover, and when the tripper throws the switch off it snaps back away from the opening and does not in any way interfere with the removal of the cover from the pan. Figure 1 indicates such a switch which is vertical when the current is on, and snaps to the horizontal position shown in dotted lines to shut off the current.

As shown in the drawings, the motor may be readily detached from the container by turning the handle of the pin 35 in a clock-wise direction through an angle of 180° and then slipping the flange 36 on the casing of the motor out of the socket formed by the flange 37 and the dependent portion of the cover of the container which fits over the front end of the pan. The bracket 38 supports the motor. The pin 35 is made of spring steel and holds the motor in place.

Any suitable agitating device or any suitable agitator may be used. It may comprise a plurality of agitator plates such as the plates 39 shown in the drawings and the plates may be suspended by links 36 as there shown. If preferred, wires or bars or perforated plates, etc. may be employed to agitate the liquid. The different parts of the agitator may be suspended by links from the agitator guide as shown in the drawings or a rigid frame pivoted at 4 may be used to support the parts of the agitator. The agitator is arranged in such a way that as the ice cream thickens or hardens and offers resistance to the free movement of the agitator, the change in the position of the agitator brought about by such resistance will bring some suitable member, such as the tripper 30, into a position to operate the switch.

Although, I prefer to employ a single agitator, two agitators or a double agitator may be utilized and, in other respects, the preferred arrangement shown in the drawings may be modified.

I claim:

1. A freezing container for food products adapted for insertion in the freezing compartment of a domestic refrigerator, which comprises a normally substantially vertically-extending agitating means, said agitator being displaceable from its normal vertical position, driving means for reciprocating the agitating means within the container, an electric motor for actuating the driving means, a switch in the circuit supplying power to the motor, said switch being located adjacent the path travelled by the agitator during its reciprocation and a steel spring on the agitator, said spring, when the agitator is at a considerable angle from its normal position, contacting with the switch during the reciprocation of the agitator and moving the same to a position to open the circuit supplying power to the motor.

2. A freezing container for food products adapted for insertion in the freezing compartment of a domestic refrigerator, which comprises a normally substantially vertically-extending agitating means, said agitator being displaceable from its normal vertical position, driving means for oscillating the agitating means within the container, an electric motor for actuating the driving means, a switch in the circuit supplying power to the motor, said switch being located near one end of the path of the agitator and means on the agitator for contacting with the switch when the agitator is at a considerable angle from its normal position.

3. A freezing container for food products adapted for insertion in the freezing compartment of a domestic refrigerator, which comprises a pan for holding food, a cover tightly fitting on the top of the pan, said cover having an extension which is located at one end of the pan, a driving shaft rotatable in bearings in said cover, an agitator carried by said carriage, an electric motor for driving said shaft, said shaft having means cooperating with means carried by the carriage for causing the carriage and the agitator carried thereby to be oscillated in said pan when the shaft is rotated, guide rods mounted in said cover on each side of the driving shaft, and means forming a part of the carriage cooperating with said guide rods for guiding the carriage in its oscillating movement.

4. A freezing container for food products adapted for insertion in the freezing compartment of a domestic refrigerator which comprises a pan for holding food, a cover tightly fitting on the top of the pan, said cover having an extension, a right and left handed grooved shaft in said container, bearings on opposite ends of the cover in which said shaft is rotatably mounted, an agitator carriage mounted on said shaft and having means engaging in the groove of the shaft, an agitator carried by said carriage, said agitator normally assuming a substantially vertical position but being swingable from that position, an electric motor detachably mounted on the extension of the cover, gearing between the motor shaft and the grooved shaft for imparting rotative motion to the grooved shaft, means carried by the cover for guiding said carriage whereby the carriage and the agitator carried thereby are caused to oscillate when the grooved shaft is rotated, a switch in the circuit supplying power to the motor, said switch being operable by a part of the agitator when the latter is at a considerable angle from its normal position to shut off the supply of power to the motor.

MARIE P. GRANT.